United States Patent [19]

Tanaka et al.

[11] 4,387,396
[45] Jun. 7, 1983

[54] FIELD RECOGNITION CIRCUIT

[75] Inventors: Masanobu Tanaka, Hirakata; Teruo Kitani, Takatsuki, both of Japan

[73] Assignee: Matsushita Electric Industrial Co., Ltd., Osaka, Japan

[21] Appl. No.: 292,028

[22] Filed: Aug. 11, 1981

[30] Foreign Application Priority Data

Aug. 14, 1980 [JP] Japan ................................. 55-112584

[51] Int. Cl.³ ........................ H04N 5/04; H04N 5/08; H04N 9/58
[52] U.S. Cl. .................................. 358/148; 358/92; 358/152; 358/154
[58] Field of Search ................... 358/91, 92, 148, 152, 358/154; 328/139

[56] References Cited

U.S. PATENT DOCUMENTS 4,145,713  3/1979  White ................................. 358/92
4,258,389  3/1981  Sakamoto ......................... 358/154

Primary Examiner—Joseph A. Orsino, Jr.
Attorney, Agent, or Firm—Wenderoth, Lind & Ponack

[57] ABSTRACT

An apparatus is provided for synchronizing left-and right-eye images and for providing a composite video signal for a stereoscopic television system. The synchronization operation at a field-by-field rate is assured by detecting the phase-difference between a first vertical sync pulse which is derived from the vertical sync signal which is sampled by a horizontal sync signal and a second vertical sync pulse which is constantly delayed from the vertical sync signal of the composite video signal. As a result, the left eye image is always associated with the left eye lens of the viewer and the right eye image is always associated with the right eye lens of the viewer.

6 Claims, 5 Drawing Figures

FIELD RECOGNITION CIRCUIT

BACKGROUND OF THE INVENTION

This invention relates to an apparatus for recognizing whether a field is an odd line field or an even line field of an interlaced composite video signal. More particularly, this invention relates to an apparatus for multiplexing two video signals at the field rate or decoding the multiplexed signal at the field rate (e.g. for use with signal associated with a stereoscopic television system employing alternate fields for left and right stereoscopic images and employing a PLZT viewer). The stereoscopic television system employing alternate fields for left and right eye images, which is the principal object of this invention, needs synchronization between the left and right eye images and the viewer's shutter operation. If the system falls out of sync so that the left eye image is shown to the right eye and the right eye image is shown to the left eye, the image perceived is confusing and not truly stereoscopic.

In most conventional methods of synchronization, the driving pulse of the viewer is triggered by a T-type flip-flop which is triggered by the vertical sync pulse derived from the composite video signal, but there is no way to define which field is which. In another method of synchronization, a discernible signal which is inserted in the vertical interval of the video signal prevents free editing of a video tape storing such a signal because of the fact that the discernible signal fades away after editing.

Yet another method of synchronizing by coincidence of the horizontal sync pulses with the pulses derived from the vertical sync signal cannot be expected to provide stable operation because of the critical adjustment required and its dependence upon temperature. (c.f. U.S. Pat. No. 4,145,713)

Therefore, there is a continuing need for an improvement for a stereoscopic television system which assures the identity of the odd and even line field.

SUMMARY OF THE INVENTION

This invention is directed to provide a means for the construction and viewing of the field sequential stereoscopic images and a multiplexed video signal in a stereoscopic television system. After receiving the composite video signal, the means derives the field recognition pulses and outputs them to the viewing devices. Therefore, the imaging stereoscopic images left and right eye signals can be multiplexed exactly, and when viewing, the shutter can operate surely so that the left eye image is always associated with the left eye and the right eye image is always associated with the right eye.

An object of this invention is an improvement of the stereoscopic television system.

Another object is to provide a circuit for recognizing the field from the composite video signal.

Yet another object is to make possible a stereoscopic television system which is compatible with a conventional video signal.

These and other objects of the invention will become more apparent from the following description when taken with the drawings in which:

DESCRIPTION OF THE PREFERRED EMBODIMENT

Figure 1:
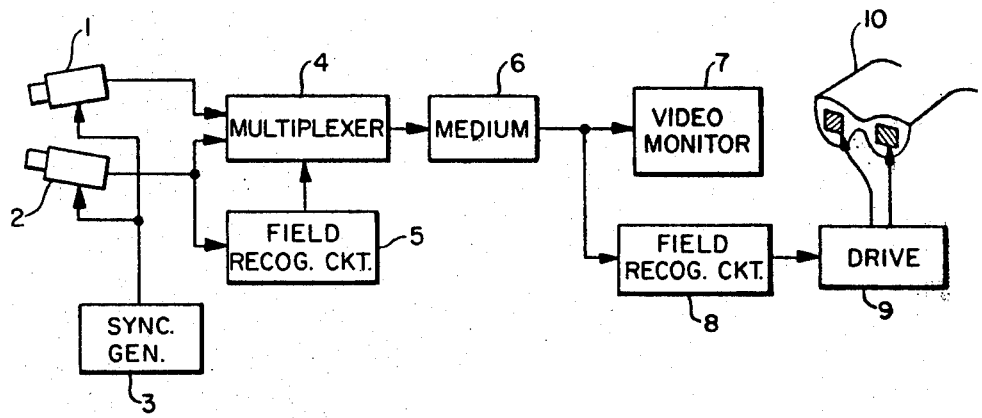
FIG. 1 is a block diagram of the representative stereoscopic television system.

Referring now to the drawings, FIG. 1 shows a typical stereoscopic television system. Field recognition circuit 5 assures synchronization in this stereoscopic television system. Video signals from cameras 1 and 2, which are synchronized by sync generator 3, are multiplexed in a field-by-field fashion in multiplexer 4 by means of the field identified pulses from field recognition circuit 5 so that the left camera signal is assigned to an odd line field and the right camera signal is assigned to an even line field. The multiplexed signal is a conventional video signal; and through medium 6, which may correspond to standard broadcast transmission lines or video tape recorders and such other mediums, the signal is connected to a video monitor 7.

The multiplexed video signal is also fed to the field recognition circuit 8 which generates field identified pulses and drives the PLZT viewer 10 with driving circuit 9. The PLZT viewer 10 closes and opens synchronously in a field by field fashion with pulses derived from the field recognition circuit 8. Therefore, true stereoscopic images can be seen.

Figure 2:
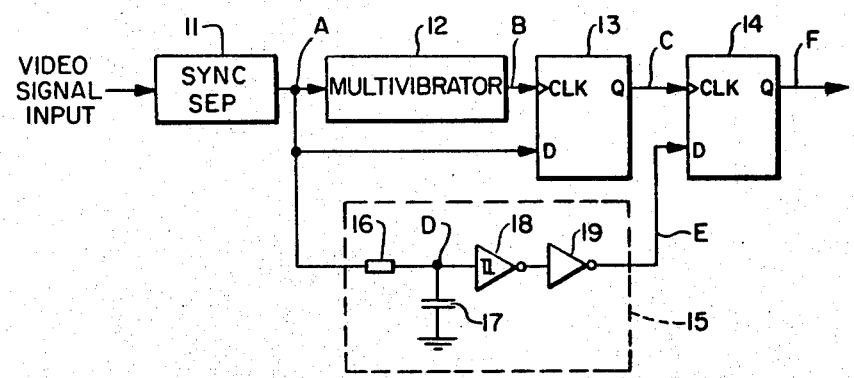
FIG. 2 is a circuit diagram of the invention.
Figure 4A:
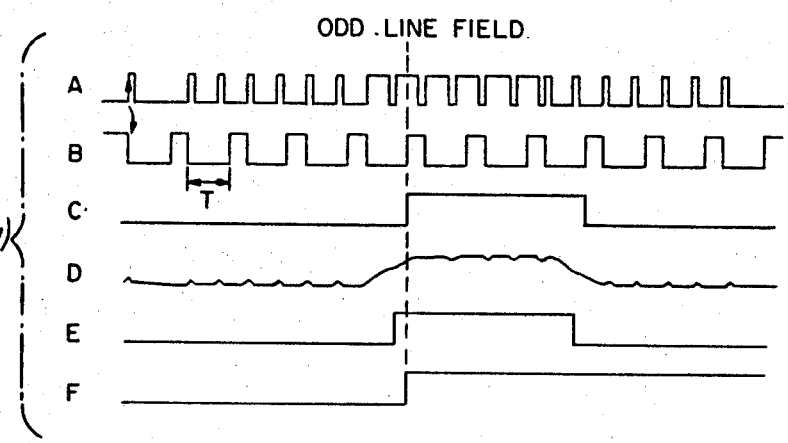
FIG. 4 shows a timing diagram of a circuit of the present invention.
Figure 4B:
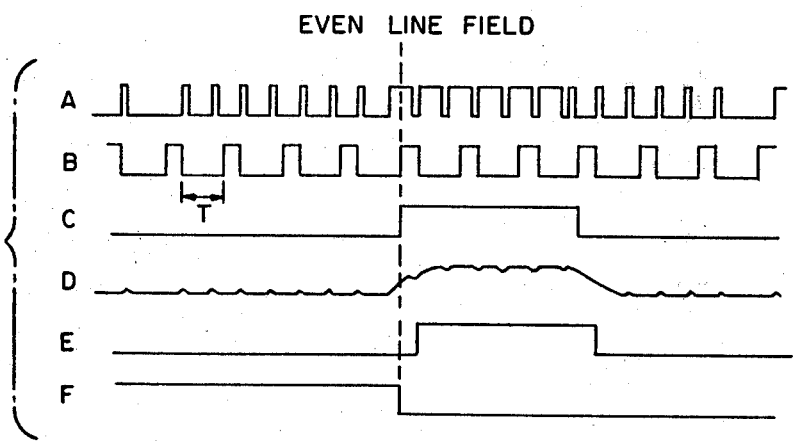

FIG. 2 depicts a detailed drawing of the field recognition circuits 5 and 8 in FIG. 1, and FIGS. 4(a) and 4(b) show the timing diagrams (FIG. 4(a) shows the odd line field and FIG. 4(b) shows the even line field).

Referring to FIG. 2 and FIG. 4(a) with respect to an odd line field, an input video signal is connected to sync separator means 11, and the derived composite sync pulse train A is shown in FIG. 4(a). From composite sync pulse A, a non-retriggerable monostable multivibrator 12 (this is one of the horizontal pulse deriving means) having typical pulse width T of $\frac{3}{4}$ H (H refers to the horizontal scanning period) derives a continuous horizontal pulse train B. Because the monostable multivibrator 12 has the typical pulse width of $\frac{3}{4}$ H, it is triggered by the rising edge of the composite sync pulse train A, but is not triggered by the equalizing pulses which are located between the horizontal sync pulses. Composite sync pulse train A is sampled at the rising edge of horizontal pulse train B by a D-type flip-flop 13 (e.g. Motorola Corporation's MC14013B) which is one of the first phase detector means, and derives the first vertical sync pulse C as shown in FIG. 4(a), which is typically delayed $\frac{3}{4}$ H from the original vertical sync. The pulse width of the monostable multivibrator 12 is permitted to be between $\frac{1}{2}$ H and H, and the rising edge of the pulse is in the period of the high level of the composite sync pulse train A as shown in FIG. 4(a).

On the other hand, composite sync pulse train A is integrated by the R-C filter (resistor 16 and capacitor 17) as waveform D in FIG. 4(a), and derives the second vertical sync pulse E which is typically delayed $\frac{1}{2}$ H by a Schmitt trigger 18 and inverter 19. This vertical sync separator means 15 provide a $\frac{1}{2}$ H delay for the vertical sync. The second phase detector means comprises a D-type flip-flop 14 which detects the phase difference between the two vertical sync pulses C and E (in this case pulse C is used for the clock input and pulse E is used for the data input), and derives a field identified pulse F changing from a Low to a High level. Now, since this D-type flip-flop is employed only as a phase detector, the two input signals can be connected to either the clock or data inputs. If connecting inversely to that shown in FIG. 2, for example, the field identified pulse F also inverts the output levels thereof.

Next, referring to FIG. 4(b) with respect to an even line field, the operations are almost same as those of FIG. 4(a) referred to above, but the first vertical sync pulse C sampled by the horizontal pulse train B is typically delayed $\frac{1}{4}$ H from the original vertical sync signal. The second vertical sync pulse E is typically delayed $\frac{1}{2}$ H as above, so that D-type flip-flop 14 derives the field identified pulse F changing from a High to a Low level. Because the first vertical sync pulse C which is sampled by the horizontal pulse train B has a delay time which is different by $\frac{1}{2}$ H between odd line fields and even line fields, the delay time of the second vertical sync pulse E can be adjustable so as to be in the middle of that time. For use as the non-retriggerable monostable multivibrator 12, two units of a quad 2-input NOR gate (e.g. Motorola Corporation's MC14001B) are also applicable.

Figure 3:
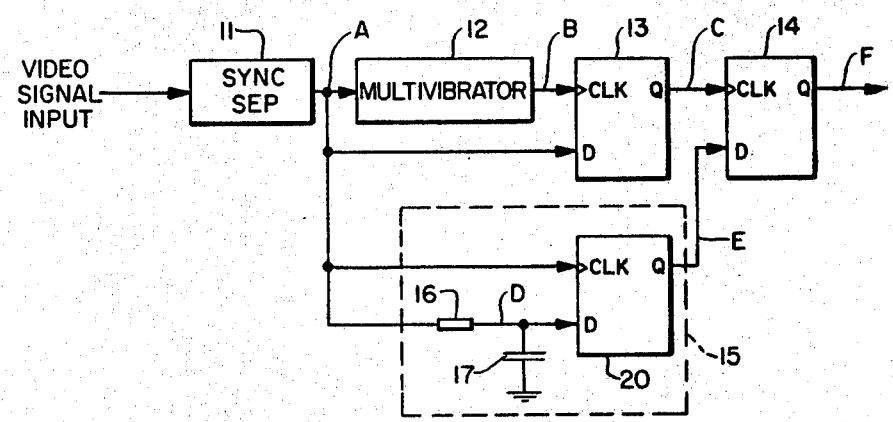
FIG. 3 is another circuit diagram of the invention.

FIG. 3 shows another example circuit of this invention. The timing diagram of this circuit is the same as FIGS. 4(a) and 4(b). The difference from FIG. 2 is in the vertical sync separator means 15 which operates as a $\frac{1}{2}$ H delay line for the vertical sync.

The composite sync pulse train A is connected directly to the clock input of the D-type flip-flop 20 and is also connected to the data input via an R-C filter with a time constant within $\frac{1}{2}$ H. The data input D, as shown in FIG. 4 is latched by the rising edge of the composite sync pulse train A, and the D-type flip-flop 20 outputs the second vertical sync pulse E which is delayed $\frac{1}{2}$ H from the original vertical sync.

Since the rising edge of second vertical sync pulse E is regulated by the rising edge of the composite sync pulse train A, the time constant of the R-C circuit is halved in this circuit, and improved operation is expected.

Obviously, many modifications and variations of the present invention are possible in the light of the above teachings, and it is therefore understood that the invention can be practiced otherwise than as specifically described.

What is claimed is:

1. An apparatus for deriving field identified pulses from an input video signal, said apparatus comprising:
    a sync separator means for separating composite sync signals from said input video signal;
    a pulse deriving means for deriving a pulse at a rate corresponding to that of continuous horizontal pulses from said composite sync signal;
    a first phase detector means for providing a first vertical sync pulse by sampling said composite sync signal with said derived pulse;
    a vertical sync separator means for deriving a second vertical sync pulse which is delayed by a constant amount from said composite sync signal; and
    a second phase detector means for providing High and Low level pulses respectively corresponding to one field and sequential other field of a composite video signal by detecting a phase difference between said first vertical sync pulse and said second vertical sync pulse.

2. An apparatus according to claim 1, wherein said pulse deriving means includes a monostable multivibrator for producing pulses having a pulse width of between $\frac{1}{2}$ H and H, wherein H corresponds to a horizontal sync period.

3. An apparatus according to claim 1, wherein said first phase detector means includes a D-type flip-flop, said derived pulse being used as a clock input and said composite sync signal being used as a data input.

4. An apparatus according to claim 1, wherein said second phase detector means includes a D-type flip-flop.

5. An apparatus according to claim 1, wherein said vertical sync separator means includes a D-type flip-flop having said composite sync signal supplied thereto via a filter having its time constant within $\frac{1}{2}$ H, said filtered sync signal being used as a data input and said composite sync signal being used as a clock input, wherein H corresponds to a horizontal sync period.

6. An apparatus according to claim 2, wherein said vertical sync separator means includes at least a filter and a comparator for deriving a pulse which is delayed from said second vertical sync pulse by a delay of from $(T-\frac{1}{2} H)$ to T, wherein T corresponds to said pulse width of said pulses produced by said monostable multivibrator.

* * * * *